(12) United States Patent
Ura (10) Patent No.: US 9,030,181 B2
(45) Date of Patent: May 12, 2015

(54) ELECTRIC POWER STEERING APPARATUS

(75) Inventor: Noritake Ura, Anjo (JP)

(73) Assignee: JTEKT Corporation, Osaka (JP)

( * ) Notice: Subject to any disclaimer, the term of this patent is extended or adjusted under 35 U.S.C. 154(b) by 93 days.

(21) Appl. No.: 13/806,991

(22) PCT Filed: Sep. 28, 2011

(86) PCT No.: PCT/IB2011/002249
§ 371 (c)(1),
(2), (4) Date: Dec. 26, 2012

(87) PCT Pub. No.: WO2012/042345
PCT Pub. Date: Apr. 5, 2012

(65) Prior Publication Data
US 2013/0099759 A1    Apr. 25, 2013

(30) Foreign Application Priority Data
Sep. 29, 2010    (JP) ................................ 2010-219390

(51) Int. Cl.
G05F 1/00    (2006.01)
G05F 1/46    (2006.01)
B62D 5/04    (2006.01)

(52) U.S. Cl.
CPC ............... *G05F 1/462* (2013.01); *B62D 5/046* (2013.01); *B62D 5/0481* (2013.01)

(58) Field of Classification Search
USPC .......... 323/207, 222, 271, 282–285; 320/103, 320/104, 116–121
See application file for complete search history.

(56) References Cited

U.S. PATENT DOCUMENTS

| 4,684,814 A * | 8/1987 | Radomski ........................ 290/31 |
| 7,746,031 B2 * | 6/2010 | Ishishita ........................ 320/132 |
| 2008/0129249 A1 | 6/2008 | Ishishita |
| 2009/0039707 A1 | 2/2009 | Ishizeki |

FOREIGN PATENT DOCUMENTS

| CN | 101142733 A | 3/2008 |
| EP | 2 208 658 A1 | 7/2010 |
| EP | 2 210 784 A1 | 7/2010 |
| EP | 2 226 237 A1 | 9/2010 |

(Continued)

OTHER PUBLICATIONS

International Search Report issued in International Patent Application No. PCT/IB2011/002249 mailed Jan. 9, 2012.

(Continued)

*Primary Examiner* — Nguyen Tran
(74) *Attorney, Agent, or Firm* — Oliff PLC (57) ABSTRACT

An electric power steering apparatus includes a power supply and a power supply management unit that controls an operation of the power supply. The power supply includes a main power supply, an auxiliary power supply connected in series to the main power supply, a boost circuit that charges the auxiliary power supply by boosting an output voltage of the main power supply and applying the boosted output voltage to the auxiliary power supply, and a voltage sensor that detects an output voltage of the auxiliary power supply. When a reduction amount per unit time of the output voltage detected by the voltage sensor exceeds a voltage reduction amount over a predetermined time, the power supply management unit determines that an abnormality has occurred in an output destination of the power supply.

1 Claim, 4 Drawing Sheets

(56) References Cited

FOREIGN PATENT DOCUMENTS

| | | |
|---|---|---|
| JP | A-2007-135374 | 5/2007 |
| JP | A-2007-223510 | 9/2007 |
| JP | 2009-012728 A | 1/2009 |
| JP | 2009-078742 A | 4/2009 |
| JP | 2009-120097 A | 6/2009 |
| JP | 2009-280039 A | 12/2009 |

OTHER PUBLICATIONS

Written Opinion of the International Searching Authority issued in International Patent Application No. PCT/IB2011/002249 mailed Jan. 9, 2012.

Sep. 3, 2014 Office Action issued in Chinese Patent Application No. 201180034669.7.

Jan. 6, 2015 Office Action issued in Japanese Patent Application No. 2011-061855.

\* cited by examiner

ELECTRIC POWER STEERING APPARATUS

BACKGROUND OF THE INVENTION

1. Field of the Invention

The invention relates to an electric power steering apparatus.

2. Description of Related Art

An electric power steering apparatus (EPS) having a motor as a drive source is known as a power steering apparatus for a vehicle. An EPS exhibits a greater degree of layout freedom and lower energy consumption than a hydraulic power steering apparatus, and therefore EPS apparatuses are being used ever more widely, irrespective of vehicle type, vehicle classification, and so on.

In a vehicle having a battery (and an alternator serving as a charger) as a main power supply, however, there is a limit to a magnitude of the power output from the battery. Therefore, in a large vehicle, an assist force of the EPS may be insufficient in conditions where a large amount of power is required, such as when a steering operation is performed while stationary (during so-called stationary steering), and as a result, a steering wheel operation may not be performed smoothly.

In response to this problem, a power supply device in which an auxiliary power supply is provided separately to the main power supply has been proposed. In this device, power supply using the auxiliary power supply is performed in addition to normal power supply using only the main power supply, and therefore power can be supplied in a condition where the main power supply and the auxiliary power supply are connected in series. For example, Japanese Patent Application Publication No. 2007-223510 (JP-A-2007-223510) discloses this type of EPS including a main power supply and an auxiliary power supply.

Further, since the power supply of this type of EPS handles large amounts of power, faults (short circuit faults, for example) in the output of the power supply must be detected, and when an abnormality occurs, a current supplied to an output destination of the power supply must be shut off to prevent damage to the output destination. A shunt circuit in which a shunt resistor is disposed on an output circuit of a power supply so that an overcurrent caused by a short circuit is detected in accordance with variation in a potential difference between respective ends of the shunt resistor has been proposed as means for detecting a fault in the output of the power supply (Japanese Patent Application Publication No. 2007-135374 (JP-A-2007-135374), for example).

However, component sizes and component numbers are being reduced in vehicles with a view to improving fuel efficiency and reducing cost, and similar demands are being made of the EPS described above. In an EPS that handles a large amount of power such as that described above, however, the shunt circuit is provided on the output circuit of the power supply in order to detect faults in the output of the power supply device, and therefore the size of the shunt circuit increases in proportion to the magnitude of the output of the power supply, making it difficult to reduce the size and cost (and the number of components) of the power supply.

SUMMARY OF THE INVENTION

The invention provides an electric power steering apparatus that includes a small, inexpensive, and high-power output power supply, so that a fault in an output of the power supply is detected with a simpler configuration.

An aspect of the invention relates to an electric power steering apparatus including a power supply and power supply managing means for controlling an operation of the power supply. The power supply includes a main power supply, an auxiliary power supply connected in series to the main power supply, a boost circuit that charges the auxiliary power supply by boosting an output voltage of the main power supply and applying the boosted output voltage to the auxiliary power supply, and voltage detecting means for detecting an output voltage of the auxiliary power supply. When a reduction amount per unit time of the output voltage detected by the voltage detecting means exceeds a voltage reduction amount over a predetermined time, the power supply managing means determines that an abnormality has occurred in an output destination of the power supply.

According to this aspect, the voltage detecting means of the power supply provided in the electric power steering apparatus detects the output voltage of the auxiliary power supply, and when the reduction amount per unit time of the detected output voltage of the auxiliary power supply exceeds the reduction amount over the predetermined time, it is determined that a charge stored in the auxiliary power supply has been discharged abnormally, and therefore that an abnormality has occurred in the output destination of the power supply.

With this aspect, a detection sensor that is smaller and less expensive than a typical shunt resistor is used as a constitutional component for detecting a short circuit fault in the output of the power supply, and therefore a short circuit fault can be detected with a simpler configuration. As a result, reductions in the size and cost of the electric power steering apparatus can be realized.

In the aspect described above, the boost circuit may include a boost coil to one end of which an output voltage of the main power supply is applied, and first switching means that becomes conductive when switched on so as to be capable of grounding another end of the boost coil. The boost circuit may apply a boost voltage, based on an induced voltage generated in the boost coil when the first switching means is switched off, to the auxiliary power supply. When the power supply managing means determines that the abnormality has not occurred and the output voltage detected by the voltage detecting means is no greater than a predetermined voltage threshold, the power supply managing means may switch the first switching means on and off.

According to this aspect, the boost coil of the boost circuit, to which the output voltage of the main power supply is applied, is grounded when the first switching means is switched on, and the boost voltage based on the induced voltage generated in the boost coil is applied to the auxiliary power supply when the first switching means is switched off. Further, when the output voltage of the auxiliary power supply detected by the voltage detecting means is no greater than the predetermined voltage threshold, the power supply managing means boosts the output voltage of the main power supply by switching the first switching means on and off, whereby the auxiliary power supply is charged.

With this aspect, the voltage detecting means for detecting the output voltage of the auxiliary power supply can be used both to charge the auxiliary power supply using the boost circuit and to detect an abnormality in the output destination of the power supply. Therefore, the number of constitutional components can be reduced in comparison with a case where separate constitutional components are required for these operations, and as a result, these operations can be performed with a simpler configuration. Accordingly, reductions in the size and cost of the electric power steering apparatus can be realized.

In the aspect described above, the boost circuit may include second switching means that becomes conductive when switched on so as to connect the other end of the boost coil to an output terminal of the auxiliary power supply. The power supply may include a relay switch connected to an output terminal of the main power supply. The power supply managing means may store an occurrence of the abnormality, and when the occurrence of the abnormality is stored, the power supply managing means may switch the relay switch off, switch the first switching means off, and switch the second switching means on, regardless of a value of the output voltage.

In other words, according to this aspect, when an occurrence of the abnormality is stored in the power supply managing means, the power supply managing means connects the boost coil to the output terminal of the auxiliary power supply by switching the relay switch connected to the output terminal of the main power supply off. Accordingly, a closed circuit is formed in the interior of the power supply such that the charge stored in the auxiliary power supply is discharged from the output terminal of the auxiliary power supply to a low potential side of the auxiliary power supply via the second switching means and the boost coil, and as a result, a current supplied to the output destination of the power supply in which the abnormality has occurred is shut off.

With this aspect, when an abnormality is determined to have occurred in the output destination of the power supply, the current supplied to the output destination can be shut off through a simple configuration without adding new components (a relay switch, for example) and circuits. Accordingly, reductions in the size and cost of the electric power steering apparatus can be realized.

According to the above aspects, a fault in the output of the power supply can be detected through a simple configuration without adding a dedicated component in order to create a specialized circuit. As a result, reductions in the size and cost of the electric power steering apparatus can be realized.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
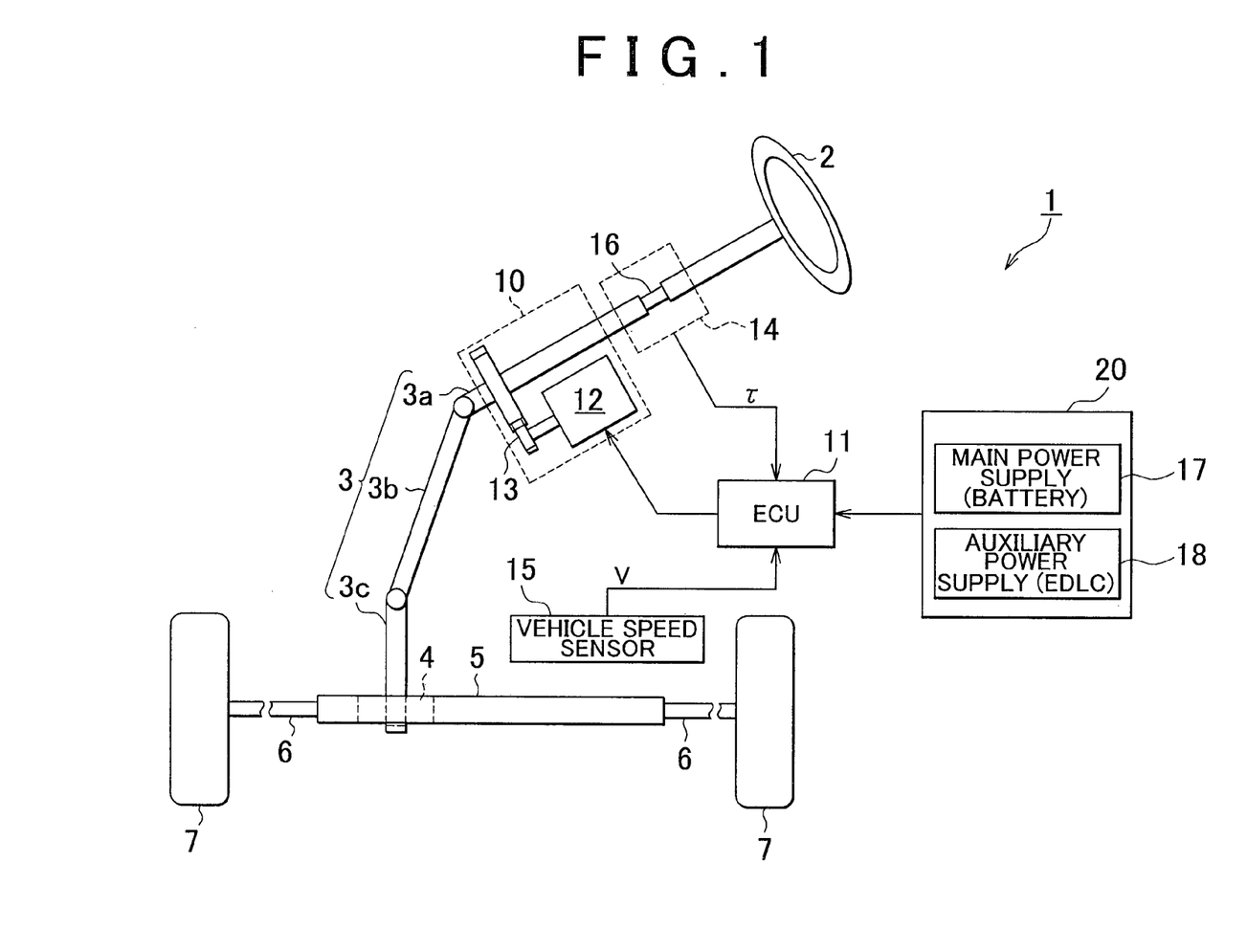
FIG. 1 is a schematic diagram of an electric power steering apparatus (EPS)

A specific embodiment of an electric power steering apparatus (EPS) according to the invention will be described below with reference to the drawings. FIG. 1 is a schematic diagram showing an EPS 1. In the EPS 1, a steering shaft 3, to which a steering wheel 2 is fixed, is coupled to a rack shaft 5 via a rack and pinion mechanism 4. Rotation of the steering shaft 3 accompanying a steering operation is converted into a reciprocating linear motion of the rack shaft 5 by the rack and pinion mechanism 4. Note that the steering shaft 3 according to this embodiment is formed by coupling a column shaft 3a, an intermediate shaft 3b, and a pinion shaft 3c. The reciprocating linear motion of the rack shaft 5 accompanying rotation of the steering shaft 3 is transmitted to a knuckle, not shown in the drawing, via a tie rod 6 coupled to either end of the rack shaft 5, and as a result, a steering angle of a steered wheel 7, or in other words an advancement direction of a vehicle, is modified.

Further, the EPS 1 includes an EPS actuator 10 serving as a steering angle assist device that applies an assist force for assisting the steering operation to a steering system, and an electronic control unit (ECU) 11 serving as means for controlling an operation of the EPS actuator 10.

The EPS actuator 10 is constituted by a so-called column type EPS actuator in which a motor 12 serving as a drive source is drive-coupled to the column shaft 3a via a speed reducing mechanism 13. Note that in this embodiment, a direct current motor having a brush is employed as the motor 12. The EPS actuator 10 reduces a speed of rotation of the motor 12 and transmits the reduced rotation to the column shaft 3a so that a resulting motor torque is applied to the steering system as the assist force.

Meanwhile, a torque sensor 14 and a vehicle speed sensor 15 are connected to the ECU 11. The torque sensor 14 is configured such that an output level of a signal thereof varies in accordance with a torsion of a torsion bar 16 provided midway on the column shaft 3a forming the steering shaft 3, or in other words a steering torque transmitted to the steering system. On the basis of a steering torque t and a vehicle speed V detected by the torque sensor 14 and the vehicle speed sensor 15, the ECU 11 calculates the assist force (a target assist force) to be applied to the steering system.

The EPS 1 further includes a power supply 20 that supplies power using a main power supply 17 (a battery) and an auxiliary power supply 18 provided separately to the main power supply 17. Note that in this embodiment, a large capacity capacitor (an electric double layer capacitor: EDLC) is used as the auxiliary power supply 18. The ECU 11 is configured to control the operation of the EPS actuator 10 by receiving a supply of power from the power supply 20 and supplying drive power to the motor 12 to cause the EPS actuator 10 to generate the target assist force (power assist control).

Figure 2:
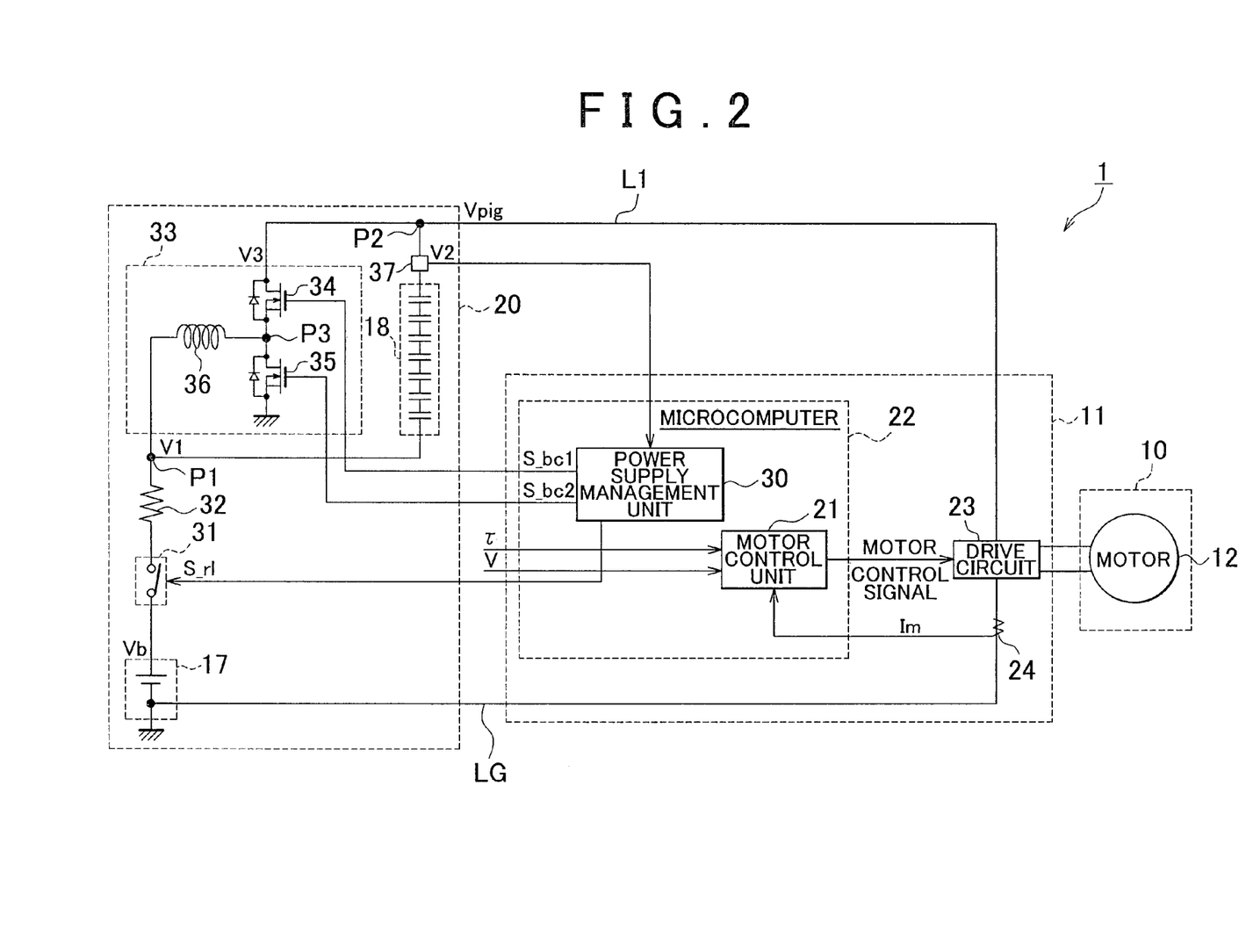
FIG. 2 is a block diagram showing an electric configuration of the EPS and a power supply.

Next, the power assist control executed by the EPS according to this embodiment will be described. FIG. 2 is a block diagram showing an electric configuration of the EPS 1. As shown in FIG. 2, the ECU 11 includes a microcomputer 22 having a motor control unit 21 that generates a motor control signal, and a drive circuit 23 that supplies the drive power to the motor 12 serving as the drive source of the EPS actuator 10 on the basis of the motor control signal. Further, the ECU 11 is provided with a current sensor 24 that detects an actual current (a motor current I m) passing through the motor 12, and the microcomputer 22 calculates the motor control signal by executing current feedback control based on the motor current I m detected by the current sensor 24.

More specifically, the microcomputer 22 calculates the target assist force at a steadily greater value (absolute value) as the steering torque τ detected by the torque sensor 14 increases and the vehicle speed V detected by the vehicle speed sensor 15 decreases. The microcomputer 22 then outputs a motor control signal calculated to align the motor current value I m with a current command value corresponding to the target assist force to the drive circuit 23.

The drive circuit 23, meanwhile, is formed by connecting a plurality of (four) switching elements (MOSFETs) in bridge form. In the drive circuit 23, one end of an upper stage side switching element 34 is connected to an output of the power supply 20 via an electric circuit L1, and one end of a lower stage side switching element 35 is connected to a ground side electric circuit LG. The drive circuit 23 outputs drive power based on an output voltage Vpig of the power supply 20 from the electric circuit L1 to the motor 12 by switching on and off alternately the respective groups of the two switching elements 34, 35 positioned diagonally opposite each other on the basis of the motor control signal output by the microcomputer 22.

In addition to the motor control unit 21, the microcomputer 22 is provided with a power supply management unit 30 (power supply managing means). The ECU 11 controls an operation of the power supply 20 by outputting various control signals (S_bc1, S_bc2, S_r1) generated by the power supply management unit 30 to the power supply 20.

Next, a configuration of the power supply according to this embodiment will be described. The power supply 20 is formed by connecting the main power supply 17 and the auxiliary power supply 18 in series. Further, a relay switch 31 and a resistor 32 (a zigzag in the drawing indicates the resistor) are interposed between the main power supply 17 and the auxiliary power supply 18 connected to an output side (a high potential side) thereof. Note that the relay switch 31 is operated on the basis of a relay control signal S_r1 output by the ECU 11. The ECU 11 (the power supply management unit 30) outputs the relay control signal S_r1 indicating that the relay switch 31 is to be switched on after detecting that an ignition switch (not shown) of the vehicle has been switched on.

Further, the power supply 20 is provided with a boost circuit 33 that is capable of charging the auxiliary power supply 18 by boosting an output voltage V1 and applying the boosted voltage to an output terminal (a connecting point P2) of the auxiliary power supply 18. Here, the output voltage V1 is a voltage based on a voltage (a batter voltage) Vb of the main power supply 17 at a connecting point P1 between the main power supply 17 and the auxiliary power supply 18 after passing through the relay switch 31 and the resistor 32.

The power supply 20 is also provided with a voltage sensor 37 (voltage detecting means) that detects an output voltage V2 (a voltage at the connecting point P2) of the auxiliary power supply 18. The ECU 11 (the power supply management unit 30) controls an operation of the boost circuit 33 by outputting control signals (S_bc1, S_bc2) to the boost circuit 33 on the basis of the output voltage V2 of the auxiliary power supply 18 detected by the voltage sensor 37.

The boost circuit 33 is constituted by a pair of switching elements 34, 35 (second switching means and first switching means, respectively) connected in series, and a boost coil 36. The boost coil 36 is connected to the connecting point P1 at one end and connected to a connecting point P3 between the switching elements 34, 35 at another end. Accordingly, the output voltage V1 based on the voltage Vb of the main power supply 17 is applied to one end of the boost coil 36. Note that N-channel MOSFETs are employed as the switching elements 34, 35 according to this embodiment. One end of the upper stage side switching element 34 is connected to the output terminal (the connecting point P2) of the auxiliary power supply 18, and one end of the lower stage side switching element 35 is grounded.

When it is determined that an abnormality to be described below has not occurred and the output voltage V2 of the auxiliary power supply 18 detected by the voltage sensor 37 is no greater than a predetermined voltage threshold, the ECU 11 (the power supply management unit 30) outputs the respective boost control signals S_bc1, S_bc2 to switch the respective switching elements 34, 35 on and off. By switching the switching elements 34, 35 on and off synchronously and alternately, the boost circuit 33 is caused to boost the output voltage V1. More specifically, the boost circuit 33 applies a boost voltage V3 generated when the lower stage side switching element (a lower stage FET) 35 having one grounded end is switched off to the output terminal (the connecting point P2) of the auxiliary power supply 18. In other words, the boost voltage V3 is output from the boost circuit 33 by switching the lower stage side switching element 35 on so as to ground another end of the boost coil 36, and superimposing an induced voltage of the boost coil 36 generated when the switching element 35 is subsequently switched off onto the output voltage V1 of the main power supply 17.

In this embodiment, the voltage sensor 37 is used as the voltage detecting means, but the voltage detecting means may be modified to the power supply management unit 30 provided in the microcomputer 22 having a voltage detection function. In so doing, the number of constitutional components can be reduced, enabling reductions in the size and cost of the EPS 1.

When the output voltage V2 of the auxiliary power supply 18 decreases by an amount exceeding a reference maximum voltage ΔVmax (a voltage reduction amount over a predetermined time) beyond which the output voltage V2 does not normally decrease, the power supply management unit 30 according to this embodiment determines that an output destination of the power supply 20 is abnormal (that the electric circuit L1 is shorted to the ground side electric circuit LG, for example).

More specifically, a charge Q stored in the capacitor of the auxiliary power supply 18 is expressed by a following Equation (1).

$$Q = CV \qquad (1)$$

where C is an electrostatic capacity and V is a voltage.

From Equation (1), the voltage V can be expressed by a following Equation (2).

$$V = Q/C \qquad (2)$$

Here, a charge Q reduced over a unit time (also referred to as a predetermined time) corresponds to a current I, and a voltage ΔV reduced over the unit time (an amount by which the output voltage V2 decreases over the unit time) is expressed by a following Equation (3).

$$\Delta V = I/C \qquad (3)$$

From Equation (3), a current (a short circuit current) that flows when the electric circuit L1 is shorted to the ground side electric circuit LG can be replaced by the voltage ΔV reduced over the unit time. When a steering operation is performed while the vehicle is stationary, the EPS 1 causes a maximum current Imax to flow, and the reference maximum voltage ΔVmax reduced over the unit time at this time can be expressed by a following Equation (4).

$$\Delta V\text{max} = I\text{max}/C \qquad (4)$$

The power supply management unit 30 determines that the output destination of the power supply 20 is abnormal (that the electric circuit L1 is shorted to the ground side electric circuit LG, for example) when the voltage ΔV reduced over the unit time, detected by the voltage sensor 37, exceeds the reference maximum voltage ΔVmax (ΔV>ΔVmax).

Figure 3:
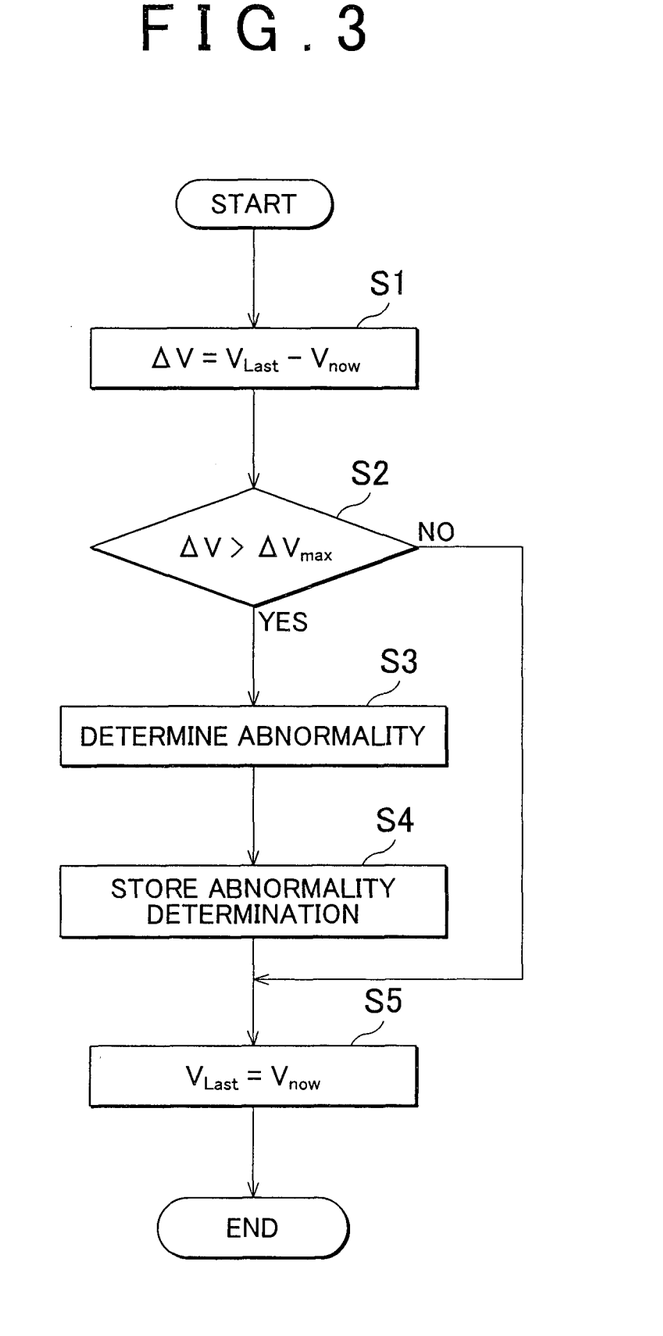
FIG. 3 is a flowchart showing an abnormality determination processing procedure executed by a power supply management unit.

FIG. 3 is a flowchart showing an abnormality determination processing procedure executed by the power supply management unit 30. An operation performed when the electric circuit L1 serving as the output of the power supply 20 is shorted to the ground side electric circuit LG will now be described with reference to the flowchart of FIG. 3. The power supply management unit 30 executes the abnormality determination processing at intervals of a predetermined period (a 50 μs period, for example). Here, Vnow is a current voltage detected by the voltage sensor 37 in a current (latest) period. Further, Vlast is a previous voltage detected by the voltage sensor 37 in an immediately preceding period.

The power supply management unit 30 calculates the voltage ΔV reduced over the predetermined time by subtracting the current voltage Vnow from the previous voltage Vlast (Step S1). Next, the power supply management unit 30 determines whether or not the voltage ΔV reduced over the predetermined time exceeds the reference maximum voltage ΔVmax of the EPS 1 reduced over the predetermined time (Step S2). When the voltage ΔV reduced over the predetermined time exceeds the reference maximum voltage ΔVmax (Step S2: YES), the power supply management unit 30 determines that an abnormality has occurred in the output destination of the power supply 20 (Step S3). Further, the power supply management unit 30 stores the occurrence of the abnormality in the output destination of the power supply 20 in a memory unit not shown in the drawings (Step S4), and sets the current voltage Vnow as the previous voltage Vlast of a following cycle (Step S5).

When the voltage ΔV reduced over the predetermined time does not exceed the reference maximum voltage ΔVmax in Step S2 (Step S2: NO), on the other hand, the power supply management unit 30 advances to Step S5 to set the current voltage Vnow as the previous voltage Vlast of the following cycle.

Here, the processing of Steps S1 to S5 corresponds to processing executed by the power supply managing means according to the invention. Through this processing, a short circuit fault in the output of the power supply can be detected.

Figure 4:
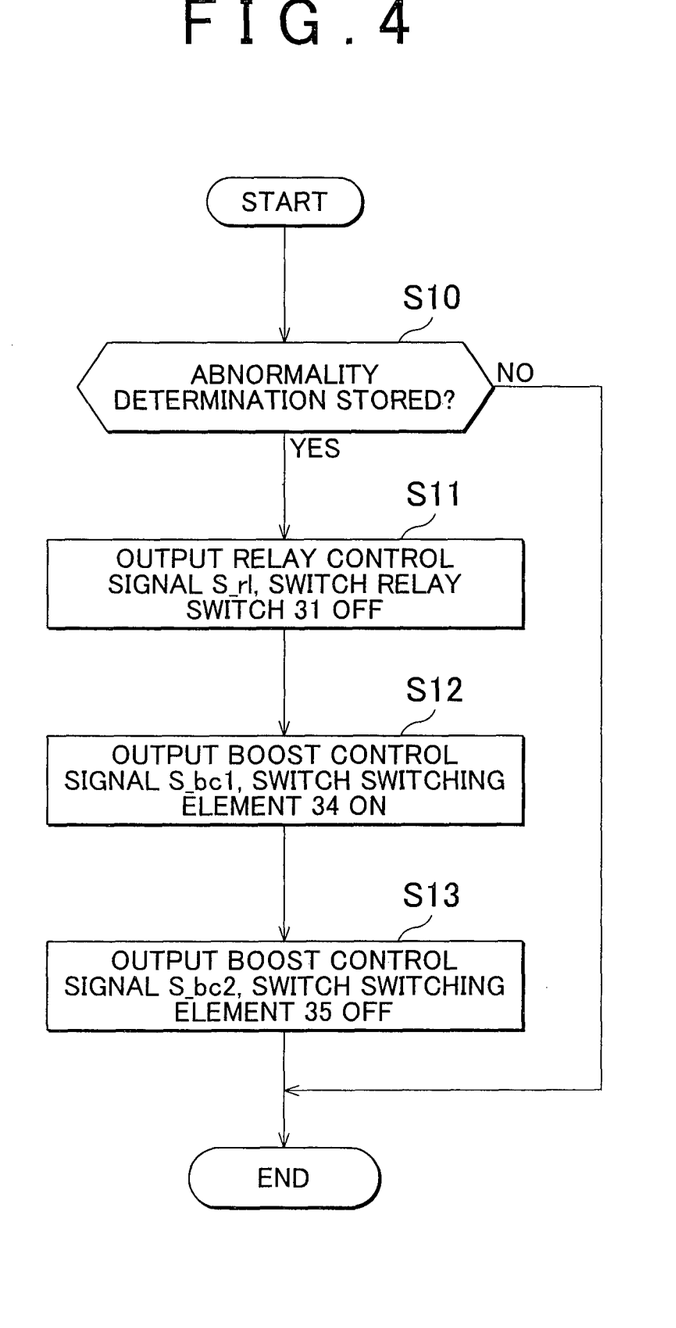
FIG. 4 is a flowchart showing a control procedure executed by the power supply management unit when an abnormality is determined.

Next, an operation performed when the power supply management unit 30 determines that an abnormality has occurred will be described with reference to a flowchart shown in FIG. 4. FIG. 4 shows a control procedure executed by the power supply management unit when an abnormality occurs. The power supply management unit 30 monitors the memory unit constantly to determine whether or not an abnormality occurrence has been stored (Step S10). When an abnormality occurrence is stored (Step S10: YES), the power supply management unit 30 switches the relay switch 31 off by outputting the relay control signal S_r1 (Step S11), switches the switching element 34 on by outputting the boost control signal S_bc1 (Step S12), and switches the switching element 35 off by outputting the boost control signal S_bc2 (Step S13), regardless of whether or not the output voltage V2 of the auxiliary power supply 18 detected by the voltage sensor 37 is no greater than the predetermined voltage threshold.

As a result, a closed circuit is formed in the interior of the power supply 20 such that the charge stored in the capacitor of the auxiliary power supply 18 is discharged from the output terminal (the connecting point P2) of the auxiliary power supply 18 to a low potential side of the auxiliary power supply 18 through the connecting point P1 via the switching element 34 and the boost coil 36, and as a result, a current supplied to the output destination of the power supply 20 in which the abnormality has occurred is shut off. The processing of Steps S10 to S13 described above corresponds to processing executed by the power supply managing means according to the invention.

As described above, with the EPS 1 according to this embodiment, a short circuit fault in the output of the power supply 20 can be detected through a simple configuration without adding dedicated components (a shunt resistor, for example) and circuits for detecting an overcurrent in the output of the power supply 20. Hence, the EPS 1 according to this embodiment can be realized in a smaller size and at a lower cost than a typical EPS. Further, when a short circuit fault is detected in the output of the power supply 20 of the EPS 1 according to this embodiment, the current supplied to the output destination of the power supply 20 in which the abnormality has occurred can be shut off using a simple configuration without the need for additional components (a relay switch, for example) and circuits. Hence, the EPS 1 according to this embodiment can be realized in a smaller size and at a lower cost than a typical EPS. Furthermore, in the EPS 1 according to this embodiment, heat generation and reductions in power efficiency due to power loss in a shunt resistor are eliminated, and therefore the EPS 1 according to this embodiment can be realized in a smaller size and at a lower cost than a typical EPS.

Note that the embodiment described above may be modified as follows.

(a) In the above embodiment, the invention is realized by the so-called column type EPS 1, but the invention may also be applied to a so-called pinion type or rack assist type EPS.

(b) In the above embodiment, the invention is realized by the EPS 1 in which the direct current motor including a brush is used as the drive source, but the invention may also be applied to an EPS in which a brushless motor is used as the drive source.

(c) In the above embodiment, the auxiliary power supply 18 is constituted by a large capacity capacitor (an EDLC). However, the invention is not limited thereto, and may be applied to an apparatus in which a secondary battery such as a lithium ion battery or another storage device, for example, is used as a constitutional element of the auxiliary power supply.

(d) When a capacitor is used, as in the above embodiment, the type of the capacitor is not limited to an electric double layer capacitor, and a ceramic capacitor or the like, for example, may be used instead.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. An electric power steering apparatus comprising:
a power supply, and
a power supply management unit configured to control an operation of the power supply,
wherein the power supply includes a main power supply, an auxiliary power supply connected in series to the main power supply, a boost circuit that charges the auxiliary power supply by boosting an output voltage of the main power supply and applying the boosted output voltage to the auxiliary power supply, a voltage detector detecting an output voltage of the auxiliary power supply, and a relay switch connected to an output terminal of the main power supply, wherein
the boost circuit includes a boost coil that applies the output voltage of the main power supply to one end of the boost coil, a first switching unit that becomes conductive when switched on so as to be capable of grounding another end of the boost coil, and a second switching unit that becomes conductive when switched on so as to connect the other end of the boost coil to an output of terminal of the auxiliary power supply, the boost circuit applies a boost voltage, based on an induced voltage generated in the boost coil when the first switching unit is switched off, to the auxiliary power supply, when a reduction amount per unit time of the output voltage of the auxiliary power supply detected by the voltage detector exceeds a voltage reduction amount over a predetermined time, the power supply management unit is configured to determine that an abnormality has occurred in an output destination of the power supply, when the power supply management unit determines that the abnormality has not occurred and the output voltage of the auxiliary power supply detected by the voltage detector is no greater than a predetermined voltage threshold, the power supply management unit is configured to switch the first switching unit on and off, and the power supply management unit is configured to store an occurrence of the abnormality, and when the occurrence of the abnormality is stored, the power supply management unit is configured to switch the relay switch off, switch the first switching unit off, and switch the second switching unit on, regardless of a value of the output voltage of the auxiliary power supply.

* * * * *